United States Patent [19]

Rubin

[11] Patent Number: 4,640,829
[45] Date of Patent: Feb. 3, 1987

[54] SYNTHESIS OF CRYSTALLINE SILICATE ZSM-50 USING DIBENZYLDIMETHYLAMMONIUM IONS AND THE PRODUCT PRODUCED

[75] Inventor: Mae K. Rubin, Bala Cynwyd, Pa.

[73] Assignee: Mobil Oil Corporation, New York, N.Y.

[21] Appl. No.: 770,943

[22] Filed: Aug. 30, 1985

Related U.S. Application Data

[63] Continuation-in-part of Ser. No. 705,822, Feb. 26, 1985, abandoned, which is a continuation-in-part of Ser. No. 684,182, Dec. 20, 1984, abandoned, which is a continuation of Ser. No. 600,680, Apr. 16, 1984, abandoned.

[51] Int. Cl.$^4$ .............................................. C01B 33/28
[52] U.S. Cl. ..................................... 423/328; 423/277; 423/326; 423/329; 423/330; 423/331; 423/332; 502/60; 502/62; 502/77; 502/202
[58] Field of Search ................................ 423/326-333; 502/60, 62, 65, 66, 77

[56] References Cited

U.S. PATENT DOCUMENTS

| 4,287,166 | 9/1981 | Dwyer et al. | 423/329 |
| 4,296,083 | 10/1981 | Rollmann | 423/329 |
| 4,537,754 | 8/1985 | Casci et al. | 423/329 |
| 4,552,738 | 11/1985 | Rubin | 423/328 |
| 4,585,637 | 4/1986 | Rubin | 423/328 |

FOREIGN PATENT DOCUMENTS

| 0042226 | 12/1981 | European Pat. Off. ............ 423/326 |
| 0051318 | 5/1982 | European Pat. Off. . |

OTHER PUBLICATIONS

Lok et al, Zeolites, 1983, vol. 3, Oct., 282-291.

Primary Examiner—John Doll
Assistant Examiner—Jackson Leeds
Attorney, Agent, or Firm—Alexander J. McKillop; Michael G. Gilman; Dennis P. Santini

[57] ABSTRACT

This invention relates to a new and improved form of crystalline silicate having the structure of zeolite ZSM-50, to a new and useful improvement in synthesizing said crystalline silicate and to use of said crystalline silicate prepared in accordance herewith as a catalyst for organic compound, e.g. hydrocarbon compound, conversion.

11 Claims, No Drawings

SYNTHESIS OF CRYSTALLINE SILICATE ZSM-50 USING DIBENZYLDIMETHYLAMMONIUM IONS AND THE PRODUCT PRODUCED

CROSS-REFERENCE TO RELATED APPLICATIONS

This is a continuation-in-part of application Ser. No. 705,822, filed Feb. 26, 1985, now abandoned, which is a continuation-in-part of application Ser. No. 684,182, filed Dec. 20, 1984, now abandoned, which is a continuation of application Ser. No. 600,680, filed Apr. 16, 1984, now abandoned.

BACKGROUND OF THE INVENTION

1. Field Of The Invention

This invention relates to a new and improved form of crystalline silicate, to a new and useful improvement in synthesizing said crystalline silicate and to use of the crystalline silicate prepared in accordance herewith as a catalyst for organic compound, e.g. hydrocarbon compound, conversion.

More particularly, this invention relates to an improved method of preparing crystalline silicate having the structure of ZSM-50 of high silica/alumina mole ratio whereby synthesis is facilitated and reproducible and the silicate product exhibits high purity and catalytic utility.

2. Discussion Of Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449) zeolite ZSM-20 (U.S. Pat. No. 3,972,983), ZSM-35 (U.S. Pat. No. 4,016,145), ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

The prior art techniques for synthesis of zeolites utilize reaction mixtures containing various organic directing agent. The directing agent is extremely important in such synthesis methods since it functions as a template in the nucleation and growth of the desired zeolite. Different directing agents direct nucleation and growth of different zeolites from even similar reaction mixtures. Even with the same directing agent, however, different zeolites will form occasionally, depending upon such factors as reaction mixture composition. Still further, the crystallization conditions, such as temperature and time, may affect product type and quality.

U.S. Pat. No. 4,391,785 teaches a method for synthesis of zeolite ZSM-12 from a reaction mixture comprising, as a directing agent, a compound selected from the group consisting of dimethyl pyridinium halide and dimethyl pyrrolidinium halide. U.S. Pat. No. 4,296,083 claims synthesizing zeolites characterized by a constraint index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine. The latter patent mentions dibenzyldimethylammonium compounds as possibly useful sources of organic nitrogen-containing cations.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,112,056 teaches a synthesis method for ZSM-12 from a reaction mixture containing tetraethylammonium ions as directions agent. U.S. Pat. No. 4,452,769 claims a method for synthesizing ZSM-12 from a reaction mixture containing methyltriethylammonium ions as the directing agent.

A zeolite structure, called "EU-1" in European Patent Application No. 42,226, "TPZ-3" in European Patent Application No. 51,318 and "ZSM-50" in U.S.

application Ser. No. 101,252, is shown to be synthesized from a reaction mixture comprising a hexamethylene diammonium salt directing agent.

U.S. Pat. Nos. 3,699,139 and 3,783,124 teach use of benzyltrimethylammonium ions as directing agents in synthesis of crystalline materials other than zeolite ZSM-50. U.S. Pat. No. 3,947,482 describes a method for synthesis of open pore zeolite such as offretite by hydrothermal reaction of a silica source, alumina source, sodium hydroxide and/or potassium hydroxide in the presence of a zeolite nucleation slurry synthesized from a mixture of a silica source, alumina source, sodium hydroxide and/or potassium hydroxide and an organic template, the template potentially being a benzyltrimethylammonium compound.

Applicant knows of no prior art methods for preparing crystalline silicate ZSM-50 utilizing the present improved method.

SUMMARY OF THE INVENTION

An improved, reproducible, lower cost method for preparing an improved crystalline silicate identified as zeolite ZSM-50 over an unusually wide range of aluminum content exhibiting high purity, high crystallinity, catalytic activity and other valuable properties is provided. The method comprises forming a reaction mixture containing sources of alkali metal cations, an organic nitrogen-containing cation, an oxide of silicon, water and an oxide of aluminum and having a composition, in terms of mole ratios, within the following ranges:

|  | Broad | Preferred |
|---|---|---|
| $SiO_2/Al_2O_3$ | $\geq 250$ | $\geq 250$–1200 |
| $H_2O/SiO_2$ | 5–30 | 8–15 |
| $OH^-/SiO_2$ | 0.08–0.3 | 0.09–0.2 |
| $M/SiO_2$ | 0.08–0.3 | 0.09–0.2 |
| $R/SiO_2$ | 0.05–1.0 | 0.08–0.67 | wherein R is dibenzyldimethylammonium and M is an alkali metal ion, and maintaining the mixture until alkali metal and dibenzyldimethylammonium-containing crystals of the crystalline silicate ZSM-50 are formed. The quantity of $OH^-$ is calculated only from the inorganic sources of alkali without any organic base contribution. Thereafter, the product crystals are separated from the liquid and recovered.

Reaction conditions required consist of heating the foregoing reaction mixture to a temperature of from about 80° C. to about 175° C. for a period of time of from about 24 hours to about 120 days. A more preferred temperature range is from about 150° C. to about 160° C. with the amount of time at a temperature in such range being from about 24 hours to about 8 days.

It is a most useful circumstance that the present method is even more cost efficient when the source of the organic nitrogen-containing cation of the reaction mixture is created in situ. This is accomplished by adding to the reaction mixture, as a source of dibenzyldimethylammonium, a combination of dimethylbenzylamine and benzyl halide (e.g. chloride, bromide or iodide), which form in situ the halide salt of dibenzyldimethylammonium.

The digestion of the gel particles is carried out until crystals form. The solid product is separated from the reaction medium, as by cooling the whole to room temperature, filtering and water washing.

EMBODIMENTS

Conventional zeolite ZSM-50 is characterized, in terms of moles of oxides per 100 moles of silica on an anhydrous basis, as follows:

$$(0\text{--}10)M_{2/n}O:(1\text{--}5)Al_2O_3:(100)SiO_2$$

wherein M is at least one cation having a valence n, and wherein the zeolite is characterized by a distinctive X-ray diffraction pattern substantially as shown in Table 1.

TABLE 1

| Interplanar d-Spacing (A) | Relative Intensity, $I/I_o$ |
|---|---|
| $20.1 \pm .3$ | W |
| $11.1 \pm .17$ | S |
| $10.1 \pm .16$ | M |
| $9.7 \pm .14$ | W |
| $5.77 \pm .09$ | W |
| $5.61 \pm .09$ | W |
| $4.64 \pm .07$ | M |
| $4.35 \pm .07$ | M |
| $4.30 \pm .07$ | VS |
| $4.00 \pm .06$ | S |
| $3.85 \pm .06$ | M |
| $3.70 \pm .06$ | M |
| $3.42 \pm .05$ | W |
| $3.35 \pm .05$ | W |
| $3.27 \pm .05$ | M |
| $3.24 \pm .05$ | W |
| $2.94 \pm .04$ | W |
| $2.53 \pm .04$ | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Table 1, the relative intensities are given in terms of the symbols W=weak, M=medium, S=strong and VS=very strong. In terms of intensities, these may be generally designated as follows:

W=0–20
M=20–40
S=40–60
VS=60–100

In the conventionally synthesized form, zeolite ZSM-50 has a formula, on an anhydrous basis and in terms of moles of oxides per 100 moles of silica, as follows:

$$(0\text{--}4)R_2O:(0\text{--}10)M_{2/n}O:(1\text{--}5)Al_2O_3:(100)SiO_2$$

wherein M is an alkali or alkaline earth metal, n is the valence of M, and R is an organic cation of a diquaternary directing agent compound generally expressed by the following formula:

$$X(CH_3)_3N(CH_2)_6N(CH_3)_3X$$

wherein X is an anion, e.g. halide, such as iodide.

Conventional zeolite ZSM-50 can be prepared from a reaction mixture containing sources of an alkali or alkaline earth metal oxide, an oxide of aluminum, an oxide of silicon, an organic cation and water and having a composition, in terms of mole ratios of oxides, within the following ranges:

| Reactants | Useful | Preferred |
|---|---|---|
| SiO$_2$/Al$_2$O$_3$ | 20–100 | 30–90 |
| OH$^-$/SiO$_2$ | 0.1–0.6 | 0.1–0.3 |
| R/SiO$_2$ | 0.05–0.6 | 0.1–0.3 |
| M/SiO$_2$ | 0.01–1.0 | 0.1–0.6 | wherein M is an alkali or alkaline earth metal and R is an organic cation derived from the above identified diquaternary directing agent compound.

Crystallization of conventional zeolite ZSM-50 can be carried out at either static or stirred condition in a suitable reactor vessel, such as for example, polypropylene jars or teflon lined or stainless steel autoclaves. The total useful range of temperatures for crystallization is from about 100° C. to about 200° C. for a time of about 48 hours to about 15 days. Thereafter, the crystals are separated from the liquid and recovered.

When the crystalline silicate is synthesized in accordance with the present method, it exhibits high purity and high crystallinity and significantly enhanced catalytic activity for certain conversions of interest, including cracking and hydrocracking to make aromatic gasoline. The ZSM-50 synthesized hereby has a wider and higher silica/alumina molar ratio range than conventionally prepared ZSM-50, allowing for tailoring that ratio to suit specific purposes. The present method proves to be reproducible, less costly, and easy to carry out.

The particular effectiveness of the presently required different organic directing agent, i.e. the cation of a dibenzyldimethylammonium compound, when compared with other directing agents, such as those identified above, is believed due to its ability to function as a template in the nucleation and growth of zeolite ZSM-50 crystals in high silica/alumina ratio. This different organic directing agent functions in this fashion over an unusually wide range of reaction mixture aluminum content.

The organic directing agent source required of the present method is a dibenzyldimethylammonium compound or mixtures thereof. The compound may be, as non-limiting examples, the hydroxide or the halide, e.g. chloride, bromide or iodide. Additional economies are realized if, instead of adding the dibenzyldimethylammonium compound to the reaction mixture, it is formed in situ by adding dimethylbenzylamine and benzyl halide (e.g. chloride) in combination. The molar ratio of dimethylbenzylamine to benzyl halide must be within the range of 0.8 to 1.0 in the reaction mixture, and preferably about 1.0. The in situ formation of the required directing agent source saves relative synthesis time and cuts organic reagent costs by a factor of 40 to 100. In either event, a highly crystalline ZSM-50 product is obtained.

In the reaction mixture required of the present invention, the mole ratios of SiO$_2$/Al$_2$O$_3$ and OH$^-$/SiO$_2$ are critical, as is the temperature maintained during crystallization. If the SiO$_2$/Al$_2$O$_3$ mole ratio is below about 250 and the OH$^-$/SiO$_2$ mole ratio is above 0.3, a silicate other than zeolite ZSM-50 forms as the predominant product.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing zeolite ZSM-50 can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or a salt, e.g halide, such as chloride or bromide. The reaction mixture can be prepared either batchwise or continuously. Crystal size and crystallization time for the zeolite ZSM-50 composition will vary with the exact nature of the reaction mixture employed.

The zeolite ZSM-50 composition as prepared hereby can be identified, in terms of mole ratios of oxides and in the anhydrous state, as follows:

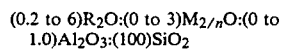

(0.2 to 6)R$_2$O:(0 to 3)M$_{2/n}$O:(0 to 1.0)Al$_2$O$_3$:(100)SiO$_2$ wherein M is at least one cation having a valence n and R is the dibenzyldimethylammonium.

The X-ray diffraction pattern of the crystalline silicate product of the present invention has the characteristic lines shown in Table 1, hereinbefore.

While the improved crystalline silicate of the present invention may be used in a wide variety of organic compound, e.g. hydrocarbon compound, conversion reactions, it is notably useful in the processes of cracking and hydrocracking.

Synthetic zeolite ZSM-50, when employed either as an adsorbent or as a catalyst in a hydrocarbon conversion process, should be dehydrated at least partially. This can be done by heating to a temperature in the range of from about 200° C. to about 550° C. in an inert atmosphere, such as air, nitrogen, etc. and at atmospheric or subatmospheric pressures for between 1 and 48 hours. Dehydration can also be performed at lower temperature merely by placing the zeolite in a vacuum, but a longer time is required to obtain a particular degree of dehydration. The thermal decomposition product of the newly synthesized ZSM-50 can be prepared by heating same at a temperature up to about 550° C. for from 1 hour to about 48 hours.

Synthetic zeolite ZSM-50 prepared in accordance herewith can be used either in the organic nitrogen-containing and alkali metal containing form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite ZSM-50 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

The synthetic zeolite ZSM-50 prepared in accordance herewith can have the original cations associated therewith, e.g., alkali metal, replaced, at least in part, by a wide variety of other cations according to techniques well known in the art. Typical replacing cations include hydrogen, ammonium and metal cations including mixtures thereof. Of the replacing metallic cations, particular preference is given to cations of metals such as rare earths and metals of Periodic Table Groups IIA, IIIA, IVA, IB, IIB, IIIB, IVB, VIB or VIII, e.g., Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

Regardless of the cation replacing the alkali metal in the synthesized form of the zeolite ZSM-50, the spatial arrangement of the aluminum, silicon and oxygen atoms which form the basic crystal lattices of zeolite ZSM-50 remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite ZSM-50 hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite ZSM-50, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite ZSM-50 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-50 catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 370° C. and 540° C. The pressure can be between 100 and 1000 psig, but is preferably between 200 and 700 psig. The liquid hourly Space velocity is generally between 0.1 and 10 $hr^{-1}$, preferably between 0.5 and 4 $hr^{-1}$ and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2 $hr^{-1}$, preferably between 0.25 and 0.50 $hr^{-1}$, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for reducing the pour point of gas oils. This process is carried out at a liquid hourly space velocity between about 10 and about 30 $hr^{-1}$ and a temperature between about 400° C. and about 540° C.

Other rections which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 40 mm Hg of n-hexane, or cyclohexane vapor, pressures less than the vapor-liquid equilibrium pressure of the respective adsorbate at room temperature. The pressure was kept constant (within about ±0.5 mm) by additon of adsorbate vapor controlled by a manostat during the adsorption period, which did not exceed about 8 hours. As adsorbate was adsorbed by the sorbant material, the decrease in pressure caused the monostat to open a valve which admitted more adsorbate vapor to the chamber to restore the above control pressures. Sorption was complete when the pressure change was not sufficient to activate the monostat. The increase in weight was calcuated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,354,078 and in *The Journal of Catalysis*, Vol. IV, pp. 522-529 (August 1965), each incorporated herein by reference as to that description. The zeolite tested in this Alpha Test must be in the hydrogen or hydronium form. This may be accomplished by hydrolysis of the zeolite followed by calcination, by contact of the zeolite with an ammonium salt or acid solution followed by calcination, or by calcination of the zeolite if it contains a hydrogen precursor by way of its synthesis.

EXAMPLE 1

A 22.0 gram quantity of dibenzyldimethylammonium chloride was dissolved in a solution of 0.42 gram of sodium aluminate (43.3% $Al_2O_3$, 32.2% $Na_2O$ and 25.6% $H_2O$), 3.17 grams NaOH and 40.0 grams of water. The resulting solution was added to 180 grams of colloidal silica (30% solution). The total was then thoroughly mixed. The mixture, which had the composition in mole ratios:

| | |
|---|---|
| $SiO_2/Al_2O_3$ = | 500 |
| $H_2O/SiO_2$ = | 10.22 |
| $OH^-/SiO_2$ = | 0.093 |
| $Na/SiO_2$ = | 0.093 |
| $R/SiO_2$ = | 0.093 | wherein R is the dibenzyldimethylammonium cation, was then allowed to crystallize in a polypropylene jar under static conditions at 100° C. for 54 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.85 wt. % | N |
| 0.56 wt. % | Na |
| 0.36 wt. % | $Al_2O_3$ |
| 81.2 wt. % | $SiO_2$ |
| 83.9 wt. % | Ash |
| 383 | $SiO_2/Al_2O_3$ molar ratio |

The X-ray results indicated crystalline ZSM-50 structure with a trace of non-zeolite ZSM-50 crystalline material.

A quantity of the product of this example was calcined at 500° C. for 16 hours in air, and then tested for sorption properties. The results indicated:

9.0 wt. % cyclohexane sorbed,
10.6 wt. % n-hexane sorbed, and
6.7 wt. % water sorbed.

Surface area of the calcined material was 463 m$^2$/g.

EXAMPLE 2

A 22 gram quantity of dibenzyldimethylammonium chloride was dissolved in a solution of 0.85 gram of sodium aluminate, 3.03 grams of NaOH and 40 grams of water. The resulting solution was added to 180 grams colloidal silica (30%). The total was then thoroughly mixed. The mixture, which had the composition in mole ratios:

| | |
|---|---|
| $SiO_2/Al_2O_3$ = | 250 |
| $H_2O/SiO_2$ = | 10.24 |
| $OH^-/SiO_2$ = | 0.094 |
| $Na/SiO_2$ = | 0.094 |
| $R/SiO_2$ = | 0.093 | was then allowed to crystallize in a polypropylene jar under static conditions at 100° C. for 53 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.97 wt. % | N |
| 0.43 wt. % | Na |
| 0.55 wt. % | $Al_2O_3$ |
| 81.2 wt. % | $SiO_2$ |
| 82.4 wt. % | Ash |
| 251 | $SiO_2/AL_2O_3$ molar ratio |

The X-ray results indicated crystalline ZSM-50 structure with a trace of non-zeolite ZSM-50 crystalline material.

A quantity of the product of this example was calcined at 500° C. for 16 hours in air, and then tested for sorption properties. The results indicated:

11.5 wt. % cyclohexane sorbed,
11.4 wt. % n-hexane sorbed, and
7.9 wt. % water sorbed.

Surface area of the calcined material proved to be 484 m$^2$/g.

EXAMPLE 3

A 22 gram quantity of dibenzyldimethylammonium chloride was dissolved in a solution of 0.21 gram of sodium aluminate, 3.26 grams of NaOH and 40 grams of water. The resulting solution was added to 180 grams colloidal silica (30% solution). The total was then thoroughly mixed. The mixture, which had the composition in mole ratios:

| | |
|---|---|
| $SiO_2/Al_2O_3 =$ | 1010 |
| $H_2O/SiO_2 =$ | 10.22 |
| $OH^-/SiO_2 =$ | 0.093 |
| $Na/SiO_2 =$ | 0.093 |
| $R/SiO_2 =$ | 0.093 | was then allowed to crystallize in a polypropylene jar under static conditions at 100° C. for 22 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.84 wt. % | N |
| 0.54 wt. % | Na |
| 0.24 wt. % | $Al_2O_3$ |
| 82.8 wt. % | $SiO_2$ |
| 85.2 wt. % | Ash |
| 586 | $SiO_2/Al_2O_3$ molar ratio |

The X-ray results indicated crystalline ZSM-50 structure with trace non-ZSM-50 crystalline material.

A quantity of the product of this example was calcined at 500° C. for 16 hours in air, and then tested for sorption properties. The results indicated:
8.1 wt. % cyclohexane sorbed,
8.8 wt. % n-hexane sorbed, and
8.2 wt. % water sorbed.
Surface area of the calcined material was 406 m²/g.

EXAMPLE 4

To a solution of 0.42 gram of sodium aluminate (43.3% and $Al_2O_3$ and 32.2% $Na_2O$), 0.80 gram of NaOH and 20.0 grams of water was added 5.3 grams of dimethylbenzylamine and 5.2 grams of benzyl chloride. This mixture was then added to 90.0 grams of colloidal silica (30%). The total was then thoroughly mixed. The mixture, which had the composition in mole ratios:

| | |
|---|---|
| $SiO_2/Al_2O_3 =$ | 252 |
| $H_2O/SiO_2 =$ | 10.24 |
| $OH^-/SiO_2 =$ | 0.054 |
| $Na/SiO_2 =$ | 0.054 |
| $R/SiO_2 =$ | 0.18 | wherein R is the reaction product cation of dimethylbenzylamine and benzyl chloride, i.e. dibenzyldimethylammonium chloride, was then allowed to crystallize in a glass-lined stainless steel static reactor at 140° C. for 21 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.60 wt. % | N |
| 0.34 wt. % | Na |
| 0.52 wt. % | $Al_2O_3$ |
| 86.07 wt. % | $SiO_2$ |
| 87.56 wt. % | Ash |
| 281 | $SiO_2/Al_2O_3$ molar ratio |

The X-ray results indicated crystalline zeolite ZSM-50.

A quantity of the product of this example was calcined at 500° C. for 16 hours in air, and then tested for sorption properties. The results indicated:
1.4 wt. % cyclohexane sorbed,
7.3 wt. % n-hexane sorbed, and
4.4 wt. % water sorbed.
Surface area of the calcined material was 311 m²/g.

EXAMPLE 5

To a solution of 0.85 gram of sodium aluminate (43.3% $Al_2O_3$ and 32.2% $Na_2O$), 4.0 grams of NaOH and 40.0 grams of water was added 11.4 grams of dimethylbenzylamine and 10.7 grams of benzyl chloride. This mixture was then added to 180 grams of colloidal silica (30% solution). The total was then thoroughly mixed. The mixture, which had the composition in mole ratios:

| | |
|---|---|
| $SiO_2/Al_2O_3 =$ | about 250 (i.e. 249) |
| $H_2O/SiO_2 =$ | 10.2 |
| $OH^-/SiO_2 =$ | 0.12 |
| $Na/SiO_2 =$ | 0.12 |
| $R/SiO_2 =$ | 0.19 | wherein R is the reation product cation of dimethylbenzylamine and benzyl chloride, i.e. dibenzyldimethylammonium chloride, was then allowed to crystallize in a polypropylene jar at 100° C. for 47 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.85 wt. % | N |
| 0.53 wt. % | Na |
| 0.70 wt. % | $Al_2O_3$ |
| 79.9 wt. % | $SiO_2$ |
| 84.8 wt. % | Ash |
| 194 | $SiO_2/Al_2O_3$ molar ratio |

The X-ray results indicated crystalline zeolite ZSM-50.

A quantity of the product of this example was calcined at 500° C. for 16 hours in air, and then tested for sorption properties. The results indicated:
12.5 wt. % cyclohexane sorbed,
11.3 wt. % n-hexane sorbed, and
8.7 wt. % water sorbed.
Surface area of the calcined material was 443 m²/g.

EXAMPLE 6

A 22.1 gram quantity of dibenzyldimethylammonium chloride was dissolved in a solution of 0.85 gram of sodium aluminate, 4.2 grams of NaOH and 180 grams of water. The resulting solution was added to 60.0 grams Hi-Sil (precipitated hydrated $SiO_2$ containing about 6 wt. % free water and about 4.5 wt. % bound water of hydration and having a particle size of about 0.02 micron). The total was then thoroughly mixed. The mixture, which had the composition in mole ratios:

| | |
|---|---|
| $SiO_2/Al_2O_3 =$ | about 250 (i.e. 249) |
| $H_2O/SiO_2 =$ | 11.1 |
| $OH^-/SiO_2 =$ | 0.13 |
| $Na/SiO_2 =$ | 0.13 |
| $R/SiO_2 =$ | 0.094 | was then allowed to crystallize in a stainless steel reactor under stirred (350 rpm) conditions at 150° C. for 8 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.37 wt. wt. % | Na |
| 1.1 wt. % | $Al_2O_3$ |
| 83.7 wt. % | $SiO_2$ |
| 87.33 wt. % | Ash |
| 129 | $SiO_2/Al_2O_3$ molar ratio |

The X-ray results indicated a 130% crystalline ZSM-50.

A quantity of the product of this example was calcined at 540° C. for 16 hours in air, and then tested for sorption properties. The results indicated:
3.4 wt. % cyclohexane sorbed,
7.8 wt. % n-hexane sorbed, and
5.1 wt. % water sorbed.

Surface area of the calcined material proved to be 304 m²/g.

EXAMPLE 7

A 105 gram quantity of dibenzyldimethylammonium chloride was dissolved in a solution of 4.08 grams sodium aluminate, 19.2 grams NaOH and 192 grams $H_2O$. The resulting solution was then added to 864.0 grams colloidal silica (30% solution). The total was then thoroughly mixed. The mixture, which had the composition in mole ratios:

| | |
|---|---|
| $SiO_2/Al_2O_3 =$ | about 250 (i.e. 249) |
| $H_2O/SiO_2 =$ | 10.25 |
| $OH^-/SiO_2 =$ | 0.12 |
| $Na/SiO_2 =$ | 0.12 |
| $R/SiO_2 =$ | 0.092 | was then allowed to crystallize in a stainless steel reactor under stirred (350 rpm) conditions at 140° C. for 5 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.73 wt. % | N |
| 0.49 wt. % | Na |
| 0.67 wt. % | $Al_2O_3$ |
| 85.2 wt. % | $SiO_2$ |
| 85.78 wt. % | Ash |
| 241 | $SiO_2/Al_2O_3$ molar ratio |

Table 2 lists the X-ray diffraction pattern of the crystalline product of this example.

TABLE 2

| Interplanar d-Spacings (A) | Observed 2 × Theta | Relative Intensities, $I/I_o$ |
|---|---|---|
| 20.7 | 4.27 | 2 |
| 11.1 | 7.94 | 21 |
| 11.05 | 8.00 | 17 |
| 10.21 | 8.66 | 14 |
| 7.70 | 11.50 | 3 |
| 6.90 | 12.80 | 3 |
| 5.80 | 15.28 | 4 |
| 5.63 | 15.74 | 4 |
| 4.88 | 18.20 | 2 |
| 4.66 | 19.04 | 35 |
| 4.44 | 20.01 | 12 |
| 4.40 | 20.20 | 25 |
| 4.32 | 20.55 | 100 |
| 4.01 | 22.17 | 60 |
| 3.83 | 23.25 | 34 |
| 3.70 | 24.02 | 27 |
| 3.65 | 24.41 | 3 |
| 3.59 | 24.78 | 3 |
| 3.44 | 25.87 | 14 |
| 3.36 | 26.5 | 19 |
| 3.29 | 27.11 | 43 |
| 3.25 | 27.43 | 25 |
| 3.15 | 28.30 | 8 |
| 3.10 | 28.84 | 7 |
| 3.05 | 29.24 | 3 |
| 3.01 | 29.68 | 1 |
| 2.96 | 30.14 | 9 |
| 2.94 | 30.46 | 5 |
| 2.90 | 30.94 | 2 |
| 2.70 | 33.12 | 5 |
| 2.65 | 33.77 | 3 |
| 2.63 | 34.12 | 4 |
| 2.57 | 34.85 | 3 |
| 2.54 | 35.28 | 13 |
| 2.52 | 35.64 | 3 |
| 2.48 | 36.22 | 4 |
| 2.41 | 37.32 | 11 |
| 2.32 | 38.75 | 6 |
| 2.30 | 39.16 | 4 |
| 2.12 | 42.69 | 4 |
| 2.06 | 43.94 | 1 |
| 2.00 | 45.44 | 5 |
| 1.95 | 46.52 | 7 |
| 1.92 | 47.33 | 7 |
| 1.88 | 48.50 | 4 |
| 1.84 | 49.48 | 4 |
| 1.78 | 51.21 | 5 |
| 1.73 | 53.02 | 3 |
| 1.70 | 53.79 | 3 |
| 1.64 | 55.98 | 6 |
| 1.62 | 56.64 | 3 |
| 1.59 | 58.11 | 2 |
| 1.55 | 59.51 | 2 |

These X-ray results indicated a 135% crystalline ZSM-50.

A quantity of the product of this example was calcined at 540° C. for 16 hours in air, and then tested for sorption properties. The results indicated:
9.3 wt. % cyclohexane sorbed,
8.4 wt. % n-hexane sorbed, and
4.7 wt. % water sorbed.

Surface area of the calcined material was 360 m²/g.

EXAMPLE 8

To a solution of 0.85 gram of sodium aluminate (43.3% $Al_2O_3$ and 32.2% $Na_2O$), 3.5 grams of NaOH, 0.7 gram of 86% KOH (86%) and 40.0 grams of water was added 5.7 grams of dimethylbenzylamine and 5.4 grams of benzyl chloride. This mixture was then added to 180 grams of colloidal silica (30%). The total was then thoroughly mixed. The mixture, which had the composition in mole ratios:

| | |
|---|---|
| $SiO_2/Al_2O_3$ = | about 250 (i.e. 249) |
| $H_2O/SiO_2$ = | 10.24 |
| $OH^-/SiO_2$ = | 0.12 |
| $K^+/(K^++Na^+)$ = | 0.10 |
| $R/SiO_2$ = | 0.094 | wherein R is reaction product cation of dimethylbenzylamine and benzyl chloride, was then allowed to crystalline in a static polypropylene jar at 100° C. for 57 days. The product crystals were separated from the remaining mixture, filtered, washed with water and dried at 115° C.

The crystalline product was submitted for chemical analysis and X-ray diffraction analysis. Chemical analysis proved the composition of the product crystals to be as follows:

| | |
|---|---|
| 0.57 wt. % | N |
| 0.52 wt. % | Na |
| 800 ppm | K |
| 0.71 wt. % | $Al_2O_3$ |
| 85.3 wt. % | $SiO_2$ |
| 85.3 wt. % | Ash |
| 204 | $SiO_2/Al_2O_3$ molar ratio |

Table 3 lists the X-ray diffraction pattern of the crystalline product of this example.

TABLE 3

| Interplanar d-Spacings (A) | Observed 2 × Theta | Relative Intensities, $I/I_o$ |
|---|---|---|
| 20.81 | 4.25 | 1 |
| 11.15 | 7.93 | 20 |
| 10.15 | 8.72 | 14 |
| 9.76 | 9.06 | 4 |
| 7.70 | 11.49 | 3 |
| 6.91 | 12.81 | 3 |
| 5.80 | 15.27 | 3 |
| 5.64 | 15.71 | 4 |
| 4.88 | 18.18 | 2 |
| 4.66 | 19.02 | 34 |
| 4.44 | 20.02 | 14 |
| 4.39 | 20.23 | 26 |
| 4.32 | 20.56 | 100 |
| 4.01 | 22.15 | 56 |
| 3.82 | 23.26 | 34 |
| 3.70 | 24.04 | 25 |
| 3.64 | 24.43 | 4 |
| 3.58 | 24.84 | 4 |
| 3.44 | 25.92 | 17 |
| 3.37 | 26.47 | 21 |
| 3.28 | 27.14 | 47 |
| 3.25 | 27.44 | 26 |
| 3.16 | 28.28 | 11 |
| 3.09 | 28.85 | 8 |
| 3.06 | 29.21 | 3 |
| 2.96 | 30.18 | 9 |
| 2.94 | 30.45 | 5 |
| 2.89 | 30.91 | 2 |
| 2.70 | 33.13 | 6 |
| 2.65 | 33.76 | 4 |
| 2.63 | 34.10 | 5 |
| 2.57 | 34.86 | 3 |
| 2.54 | 35.28 | 13 |
| 2.52 | 35.70 | 2 |
| 2.48 | 36.26 | 4 |
| 2.40 | 37.38 | 11 |
| 2.32 | 38.75 | 5 |
| 2.30 | 39.19 | 5 |

TABLE 3-continued

| Interplanar d-Spacings (A) | Observed 2 × Theta | Relative Intensities, $I/I_o$ |
|---|---|---|
| 2.16 | 42.74 | 4 |
| 2.00 | 45.41 | 5 |
| 1.95 | 46.56 | 8 |
| 1.92 | 47.35 | 7 |
| 1.88 | 48.54 | 4 |
| 1.84 | 49.44 | 5 |
| 1.82 | 49.97 | 2 |
| 1.785 | 51.16 | 4 |
| 1.73 | 53.03 | 4 |
| 1.70 | 53.86 | 3 |
| 1.64 | 56.0 | 7 |
| 1.62 | 56.70 | 3 |
| 1.59 | 58.15 | 3 |
| 1.56 | 59.57 | 2 |

These X-ray results indicate a 120% crystalline zeolite ZSM-50.

A quantity of the product of this example was calcined at 540° C. for 16 hours in air, and then tested for sorption properties. The results indicated:

3.1 wt. % cyclohexane sorbed,
7.3 wt. % n-hexane sorbed, and
5.7 wt. % water sorbed.

Surface area of the calcined material was 327 $m^2/g$.

EXAMPLE 9

Fifteen grams of the dried zeolite product from Example 2 were calcined in air at 540° C. for 10 hours. Five $NH_4$ ion exchanges were carried out at 83° C. with 10 cc of 5% $NH_4Cl$ solution per gram of zeolite sample for 1 hour each to reduce the sodium level of the sample to less than 0.01 wt. %. The ion exchanged sample was washed, dried and sized to 14/25 mesh prior to a final air calcination for 10 hours at 540° C. The calcined sample was tested for its hydrocarbon cracking activity in the Alpha Test and was found to have an Alpha Value of 46.

EXAMPLE 10

Fifteen grams of dried zeolite product from Example 7 were calcined in a nitrogen stream at 540° C. for 3 hours followed by 3 hours in an air stream at that temperature. Five $NH_4$ ion exchanges were carried out at 83° C. with 10 cc of 5% $NH_4Cl$ solution per gram of zeolite sample for 1 hour each to reduce the sodium level of the sample to less than 0.01 wt. %. The ion exchanged sample was washed, dried and sized to 14/25 mesh prior to a final air calcination for 3 hours at 540° C. The calcined sample was tested for its hydrocarbon cracking activity in the Alpha Test and was found to have an Alpha Value of 45.

What is claimed is:

1. A method for synthesizing a crystalline silicate consisting essentially of one having the structure of ZSM-50 and exhibiting a characteristic X-ray diffraction pattern as shown in Table 1 of the specification, which comprises (i) forming a reaction mixture capable of forming said crystalline silicate, said mixture comprising sources of alkali metal ions, dibenzyldimethylammonium ions, an oxide of silicon, water and an oxide of aluminum, said reaction mixture having a composition, in terms of mole ratios, within the following ranges:

| | | |
|---|---|---|
| $SiO_2/Al_2O_3$ | = | >250 |
| $H_2O/SiO_2$ | = | 5-30 |

-continued

| | | |
|---|---|---|
| OH⁻/SiO₂ | = | 0.08–0.3 |
| M/SiO₂ | = | 0.08–0.3 |
| R/SiO₂ | = | 0.05–1.0 | wherein M is said alkali metal ion and R is said dibenzyldimethylammonium ion, (ii) maintaining the reaction mixture at conditions sufficient to crystallize said silicate, and (iii) recovering the crystalline silicate having the structure of ZSM-50, said recovered crystalline silicate containing alkali metal and dibenzyldimethylammonium ions.

2. The method of claim 1 wherein said reaction mixture has a composition, in terms of mole ratios, as follows:

| | |
|---|---|
| SiO₂/Al₂O₃ | = >250–1200 |
| H₂O/SiO₂ | = 8–15 |
| OH⁻/SiO₂ | 0.09–0.2 |
| M/SiO₂ | 0.09–0.2 |
| R/SiO₂ | 0.08–0.67 |

3. The method of claim 1 comprising replacing alkali metal ions of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

4. The method of claim 2 comprising replacing alkali metal ions of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

5. The method of claim 3 wherein said replacing cation is hydrogen or a hydrogen precursor.

6. The method of claim 4 wherein said replacing cation is hydrogen or a hydrogen precursor.

7. The recovered crystalline silicate ZSM-50 product of claim 1.

8. The recovered crystalline silicate ZSM-50 product of claim 2.

9. The dibenzyldimethylammonium-containing crystalline silicate ZSM-50 product of claim 3.

10. The dibenzyldimethylammonium-containing crystalline silicate ZSM-50 product of claim 4.

11. Dibenzyldimethylammonium-containing crystalline silicate ZSM-50.

* * * * *